(No Model.)

T. R. BAUGH.
ROTARY ENGINE.

No. 597,872.

3 Sheets—Sheet 1.

Patented Jan. 25, 1898.

WITNESSES

INVENTOR,
T. Roscoe Baugh,
by John Wedderburn
Attorney (No Model.)  T. R. BAUGH.  3 Sheets—Sheet 2.
ROTARY ENGINE.

No. 597,872.  Patented Jan. 25, 1898.

WITNESSES

INVENTOR
T. Roscoe Baugh
by John Wedderburn
Attorney (No Model.) 3 Sheets—Sheet 3.
T. R. BAUGH.
ROTARY ENGINE.
No. 597,872. Patented Jan. 25, 1898.
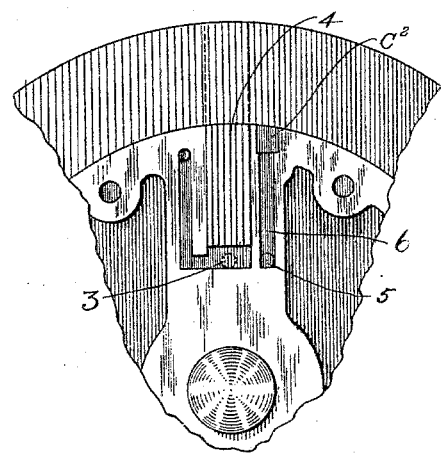
Fig. 6.
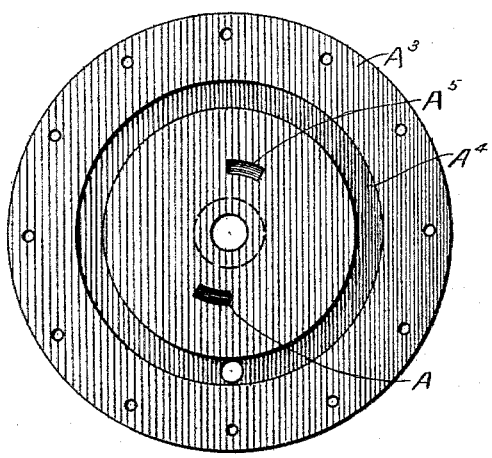 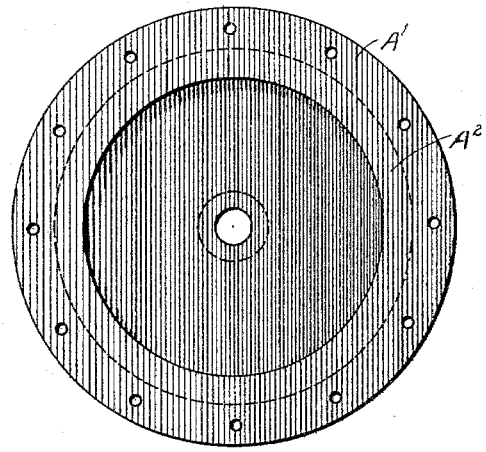
Fig. 7. Fig. 8.
WITNESSES
INVENTOR
T. Roscoe Baugh
by John Wedderburn
Attorney

UNITED STATES PATENT OFFICE.

THOMAS ROSCOE BAUGH, OF PHILLIPSBURG, MONTANA, ASSIGNOR TO JOHN NEU, OF SAME PLACE.

ROTARY ENGINE.

SPECIFICATION forming part of Letters Patent No. 597,872, dated January 25, 1898.

Application filed September 3, 1896. Serial No. 604,792. (No model.)

*To all whom it may concern:*

Be it known that I, THOMAS ROSCOE BAUGH, a citizen of the United States, residing at Phillipsburg, in the county of Granite and State of Montana, have invented certain new and useful Improvements in Rotary Engines; and I do hereby declare the following to be a full, clear, and exact description of the invention, such as will enable others skilled in the art to which it appertains to make and use the same.

My invention relates to rotary engines; and it consists of certain improvements and novelties, which will be particularly pointed out in the specification following, reference being had to the accompanying drawings, forming a part thereof, in which—

Figure 1:
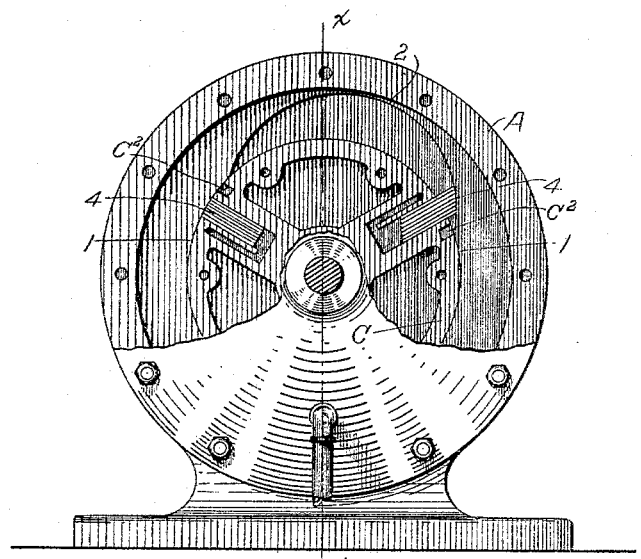
Figure 2:
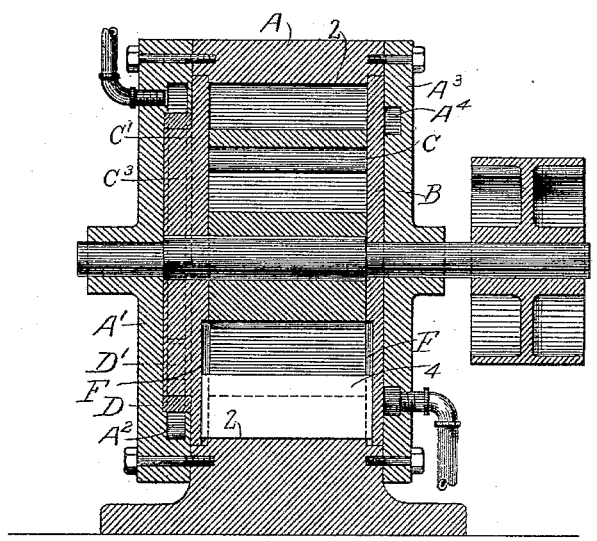
Figure 3:
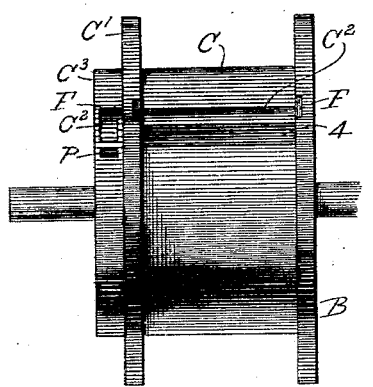
Figure 4:
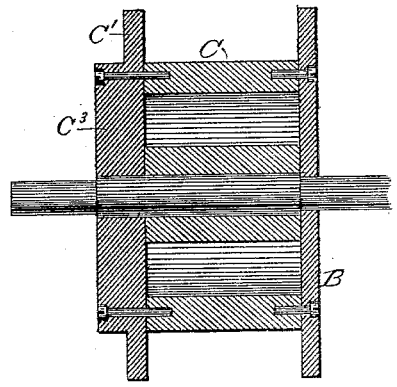
Figure 5:
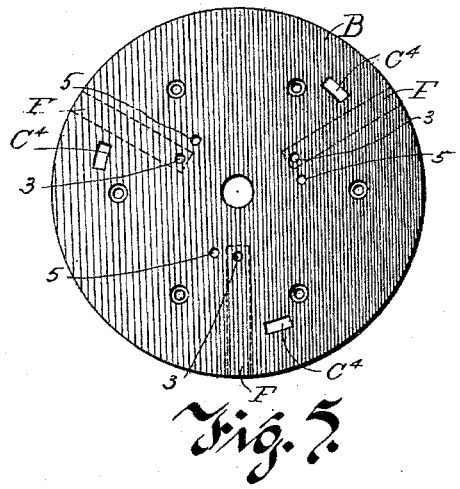

Figure 1 is an elevation of my engine with a portion of the covering-plates on one side removed to more clearly show the interior working mechanism. Fig. 2 is a central vertical section. Fig. 3 is an elevation of the rotating parts of the engine. Fig. 4 is a section of the same. Fig. 5 is a detail of the plate on the exhaust side of the rotary part. Fig. 6 is a detail, on a larger scale, of the radial plates forming the abutment. Fig. 7 is a plan view of the casing-plate and valve on the steam side. Fig. 8 is a plan of the casing-plate on the exhaust side.

The object of my invention is to provide a rotary engine which may be directly attached to rotating machinery and which may be run at high speed without wasting the propelling medium. This form of engine would very much reduce the space occupied by the engine and its weight and would save considerable in the means for connecting the engine up to the other machinery. Most engines of this class heretofore designed have been very wasteful and have consumed a great deal of power by the friction of their own parts.

In the drawings, A represents the casing, within which is placed the piston or rotating parts of the engine. This casing is made in the general form of a short cylinder with the axis horizontal. The piston rotates within the part 1 of said cylinder and is provided with two or more abutments to enter the curved recesses 2, eccentrically situated.

It will be understood that in accordance with the principle involved by this invention I contemplate constructing this rotary engine or motor with two or more abutments and with one or more recesses, according to the work to be done. In the drawings, however, I have illustrated the engine as constructed with three abutments and two recesses and will now proceed to describe with particularity this specific construction.

The piston C is cylindrical and is provided with plates on each end, which makes it an inclosed cylinder. This is shown in Fig. 3. This piston C of the engine has three slots cut in planes radial to the axis and evenly spaced about the circumference of the same—that is, being one hundred and twenty degrees apart. One of these slots and the mechanism connected therewith is shown in detail in Fig. 6. This slot contains a number of thin metal plates 4, forming the abutments. These plates are made of such a width that they may be pushed within the recess, so that their outer edges are even with the outer circumference of the rotating disk C. Means which will be hereinafter described are provided for admitting steam beneath these plates whenever steam is admitted to rotate the piston. This will force the plates outward and cause them to be in contact at their outer edges with the faces of the recesses 2 in the cylinder.

The plate C' upon the steam side of the piston C has a steam-port within the same, which is shown in Fig. 6, also in Fig. 1. This port extends radially from the outer surface of the large boss $C^3$, and then extends to the inner side, passing through the plate. At the inner side it connects with a port $C^2$ made in the outer surface of the cylinder C. Surrounding this boss $C^3$ is a valve D. This valve consists simply of a ring having steam ports or passages D'. (Shown in dotted lines in Fig. 2.) These ports are directly opposite and are made of a length to correspond with the cut-off desired in the engine. If a short cut-off is desired, they are made short, and longer for a later cut-off. The port in the boss $C^3$ is comparatively short. Rotating within the ring-valve, it will communicate between the steam-pipe and the interior of the cylinder while passing through the distance occupied by the port in the ring. After passing by the port the steam will be used expansively.

In the valve-casing plate A', which is upon the steam side, is formed a circular groove $A^2$. This is made outside the valve-ring, the said ring forming the inner surface thereof. This steam groove or passage $A^2$ is connected with the steam-pipe at any convenient point. The steam consequently surrounds the valve-ring D. The ring is made for a certain definite cut-off, but when it is desired to change this cut-off it can be done by extracting the ring and substituting another one having longer or shorter ports. This may be readily done, as the ring is made to fit within and rests in a removable manner within its seat. It may thus be readily taken out and a new one substituted. The casing-plate upon the opposite or exhaust side of the casing $A^3$ has a circular groove $A^4$ cut within its inner surface and answering as an exhaust-passage. This is likewise connected at any convenient point with an exhaust-pipe.

Upon the outer surface of the boss $C^3$ and just ahead of the main supply-port $C^2$ is located an auxiliary port P. This port communicates by a passage within said boss with the space under the plates 4. In consequence of this the steam is admitted through this port to the under side of these plates and forces them out against the surface 2. This holds them securely against that surface and prevents any leakage of steam when admitted through the main port $C^2$.

Just ahead of the groove which contains the plates 4 is located an exhaust-port $C^4$, which communicates by means of a circular channel $A^4$ with the exhaust-plate B. Communication is thus constantly maintained between that portion of the space surrounding the rotating disk and ahead of the abutment 4 with the exhaust-passage $A^4$ in the casing-plate on that side of the engine.

The space lying between the rotating disk and the surface 2 in the cylinder, which forms the steam-space, extends about one hundred and twenty degrees. As a consequence the steam back of any one of the abutments 4 begins to exhaust from the steam-space through the port lying just ahead of the set of plates immediately following at about the time when the first abutment begins to leave the steam-space.

Within the inner surface of the casing-plate $A^3$, upon the exhaust side, are formed the shallow grooves $A^5$. These are of no great length and serve a purpose hereinafter explained.

Referring to Fig. 6, the passage leading from the port P to the under side of plate C' is distinctly shown. At the bottom of the groove carrying the plate C' is seen a hole 3, shown dotted in the figure, as it is on the exhaust side. This hole 3 passes through the plate B. To one side of this is seen a similar hole 5, shown dotted for the same reason, which communicates from the outer surface of this plate to a port or passage 6, communicating with the steam-port $C^2$.

The grooves $A^5$ above mentioned are so placed that at the time when the cylinder has reached the point where the abutment 4 is leaving the steam-space and coming in contact with the surface 1 of the interior of the cylinder communication will be established through this groove $A^5$ between the holes 5 and 6 and the steam will exhaust from below the abutment 4, allowing the plates to be easily forced within their grooves and so as to be entirely embedded therein.

The three radial grooves F shown upon the inner surface of each of the plates forming the ends of the rotating cylinder or piston are grooves formed for receiving the edges of the plates forming the abutments.

If thought desirable, springs beneath the plates 4 may be substituted as a means for holding the said plates out against the inner surface of the cylinder, instead of the steam-pressure, as described.

My engine, as described, forms a compact and simple device occupying little space and little likely to get out of order. For the same power it will occupy about one-fifth the space of an ordinary high-speed reciprocating engine. It may be run at high speed and is thus adapted to be connected directly to dynamos or any other kind of machinery requiring high rotative speed. It would be a simple matter to make this engine compound as well as condensing. The manner in which this could be accomplished will be evident to any mechanic, and I will not describe the same here, as it has no necessary connection with my invention.

Having thus described my invention, what I claim as new, and desire to secure by Letters Patent, is—

1. In a rotary engine, a rotating cylinder having rotary moving plates forming a piston, a casing surrounding the same, a hub fixed to and rotating with the rotating cylinder, and having steam-ports opening upon the circumference of said hub, in combination with a valve consisting of a ring closely surrounding said hub and having ports therein, and being fixed within a circular recess in the casing, said casing having an annular steam-passage surrounding the said valve, substantially as described.

2. In a rotary engine, the combination of a cylinder having its interior surface composed of a plurality of circular segments, one-half of said segments having the same radius, and the other segments having centers eccentric the former center and lying between said surfaces and the first center, with a piston consisting of a cylinder having three radial grooves evenly spaced upon the circumference, a casing having annular grooves formed within the body of one of the heads of the cylinder and serving as a steam-chest, and having an annular groove formed upon the inner surface of the opposite side and serving as an exhaust-passage, a valve consisting of a ring having opposite segmental steam-ports therein, said valve forming the inner surface of the steam-chest, with a piston consisting of a cylinder having three radial slots evenly spaced upon the circumference, a plurality of plates within said slots, steam-ports behind, and exhaust-ports ahead of said plates, plates forming the heads of said rotating cylinder, and extending beyond the circumference thereof as a flange, one of said plates having a hub adapted to fit within the valve-ring, and having ports opening upon the circumference of said hub and connecting with the steam-ports before mentioned, an auxiliary port ahead of said steam-port and connected with the under side of the rotary plates, ports passing through the plate on the exhaust end located at the bottom of the radial slots in the piston, a passage connecting the exhaust-passage on the circumference of the piston with the port located alongside of the last-named port, and grooves within the inner surface of the exhaust-head adapted to connect the auxiliary ports, substantially as described.

In testimony whereof I have signed this specification in the presence of two subscribing witnesses.

T. ROSCOE BAUGH.

Witnesses:
HIRAM W. RODGERS,
JOHN NEU.